United States Patent
Haeusler et al.

(10) Patent No.: US 11,254,019 B2
(45) Date of Patent: Feb. 22, 2022

(54) AUTOMATIC CALIBRATION FOR A ROBOT OPTICAL SENSOR

(71) Applicant: The Boeing Company, Chicago, IL (US)

(72) Inventors: Phillip Haeusler, Melbourne (AU); Jason John Cochrane, Tecoma (AU)

(73) Assignee: The Boeing Company, Chicago, IL (US)

( * ) Notice: Subject to any disclaimer, the term of this patent is extended or adjusted under 35 U.S.C. 154(b) by 308 days.

(21) Appl. No.: 16/293,584

(22) Filed: Mar. 5, 2019

(65) Prior Publication Data

US 2020/0282575 A1    Sep. 10, 2020

(51) Int. Cl.
| | | |
|---|---|---|
| *B25J 19/02* | (2006.01) | |
| *B25J 9/16* | (2006.01) | |
| *G06F 9/30* | (2018.01) | |
| *G06T 7/80* | (2017.01) | |

(52) U.S. Cl.
CPC .......... *B25J 19/021* (2013.01); *B25J 9/1612* (2013.01); *B25J 9/1692* (2013.01); *G06F 9/3004* (2013.01); *G06T 7/80* (2017.01)

(58) Field of Classification Search
CPC ...... B25J 19/021; B25J 9/1612; B25J 9/1692; B25J 9/161; B25J 17/0283; B25J 9/1697; B25J 9/1602; G06F 9/3004; G06T 7/80; G06T 7/001; G06T 7/85; B23K 26/04; H01L 21/67259; G05B 2219/37008; G05B 2219/37009; G05B 2219/37545; G05B 2219/41098; H04N 13/246

See application file for complete search history.

(56) References Cited

U.S. PATENT DOCUMENTS

| | | | |
|---|---|---|---|
| 8,717,421 B2 | 5/2014 | Peters et al. | |
| 9,457,470 B2 * | 10/2016 | Lundberg | B25J 9/1697 |
| 10,076,842 B2 * | 9/2018 | Liu | B25J 9/1697 |

(Continued)

FOREIGN PATENT DOCUMENTS

EP    3264359 A1    1/2018

OTHER PUBLICATIONS

"Extended European Search Report Received For Application No. 20160707.4-1210", dated Jul. 17, 2020, 8 Pages.

(Continued)

*Primary Examiner* — Abby Y Lin
*Assistant Examiner* — Esvinder Singh

(57) ABSTRACT

Systems and methods are provided for automatic intrinsic and extrinsic calibration for a robot optical sensor. An implementation includes an optical sensor; a robot arm; a calibration chart; one or more processors; and a memory storing instructions that cause the one or more processors to perform operations that includes: determining a set of poses for calibrating the first optical sensor; generating, based at least on the set of poses, pose data comprising three dimensional (3D) position and orientation data; moving, based at least on the pose data, the robot arm into a plurality of poses; at each pose of the plurality of poses, capturing a set of images of the calibration chart with the first optical sensor and recording a pose; calculating intrinsic calibration parameters, based at least on the set of captured images; and calculating extrinsic calibration parameters, based at least on the set of captured images.

20 Claims, 12 Drawing Sheets

(56) References Cited

U.S. PATENT DOCUMENTS

| | | | |
|---|---|---|---|
| 10,525,597 B2* | 1/2020 | Harada | B25J 9/1692 |
| 10,628,968 B1* | 4/2020 | Ta-Huynh | G06T 7/85 |
| 10,664,994 B2* | 5/2020 | Liu | H04N 17/002 |
| 10,780,585 B2* | 9/2020 | Park | G06T 7/80 |
| 2011/0280472 A1* | 11/2011 | Wallack | G06T 7/80 |
| | | | 382/153 |
| 2013/0010081 A1* | 1/2013 | Tenney | G05B 19/4086 |
| | | | 348/47 |
| 2017/0151671 A1* | 6/2017 | Ishige | B25J 9/1697 |
| 2018/0194008 A1* | 7/2018 | Namiki | G06T 7/80 |
| 2020/0160555 A1* | 5/2020 | Mayer | H04N 5/247 |
| 2020/0298403 A1* | 9/2020 | Nilsson | G05B 19/401 |
| 2020/0298411 A1* | 9/2020 | Feiten | B25J 13/089 |

OTHER PUBLICATIONS

Rekleitis, Ioannis et al., "Automated Calibration of a Camera Sensor Network", pp. 1-6, Aug. 2, 2005.

* cited by examiner

AUTOMATIC CALIBRATION FOR A ROBOT OPTICAL SENSOR

BACKGROUND

Optical sensors, such as cameras, are used in some robotic applications, for example with computer vision (CV) applications that perform navigation, quality control (QC), and other functions on a detected object, such as those that are common in manufacturing and warehouse material handling. Proper interpretation of the collected imagery by CV applications requires that the optical sensors be calibrated. This is required to achieve accurate localization of objects relative to an end effector.

There are two primary types of calibration: intrinsic and extrinsic. Typically, the intrinsic calibration estimates parameters for an optical sensor lens to, for example, account for optical aberrations or inconsistencies inherent in the system, and are calculated in a lab environment by manually capturing a first dataset of images in ideal conditions. The extrinsic calibration parameter values of an optical sensor mounting position are also typically calculated in a lab environment by manually capturing a second dataset of images in ideal conditions after having already completed the intrinsic calibration process. During use of a robot, various environmental factors, such as vibration, lens contamination, and bumping a sensor, often triggers the need for recalibration of an optical sensor. The above-described calibration procedures are manual, and require separate image collections in two stages. Being a manual process, the calibration can be inconsistent and relies on the skill of the operator.

SUMMARY

The disclosed examples are described in detail below with reference to the accompanying drawing figures listed below. The following summary is provided to illustrate implementations disclosed herein. It is not meant, however, to limit all examples to any particular configuration or sequence of operations.

Some aspects and implementations disclosed herein are directed at automatic intrinsic and extrinsic calibration for a robot mounted optical sensor. An implementation includes an optical sensor; a robot arm; a calibration chart; one or more processors; and a memory storing instructions that cause the one or more processors to perform operations that includes: determining a set of poses for calibrating the first optical sensor; generating, based at least on the set of poses, pose data comprising three dimensional (3D) position and orientation data; moving, based at least on the pose data, the robot arm into a plurality of poses; at each pose of the plurality of poses, capturing a set of images of the calibration chart with the first optical sensor; calculating intrinsic calibration parameters, based at least on the set of captured images; and calculating extrinsic calibration parameters, based at least on the set of captured images.

The features, functions, and advantages that have been discussed are achieved independently in various implementations or are to be combined in yet other implementations, further details of which are seen with reference to the following description and drawings.

BRIEF DESCRIPTION OF THE DRAWINGS

The disclosed examples are described in detail below with reference to the accompanying drawing figures listed below:

FIG. 2 illustrates a view from a robot base mounted optical sensor 502a.
FIG. 6 is a block diagram illustrating a process 600 for automatic intrinsic and extrinsic calibration for the robot optical sensor 502a.
FIG. 7 is a block diagram illustrating a controller 700 for automatic intrinsic and extrinsic calibration for the robot optical sensor 502a.
FIG. 8 is a flow chart illustrating an implementation of automatic intrinsic and extrinsic calibration for the robot optical sensor 502a.
FIG. 9 is a block diagram illustrating a process 900 for automatic intrinsic and extrinsic calibration for the robot optical sensor 502a.
FIG. 11 is a block diagram of an apparatus of manufacturing and service method 1100 that advantageously employs automatic intrinsic and extrinsic calibration for the robot optical sensor 502a.
FIG. 12 is a block diagram of an apparatus 1200 that advantageously employs automatic intrinsic and extrinsic calibration for the robot optical sensor 502a.

Corresponding reference characters indicate corresponding parts throughout the drawings.

DETAILED DESCRIPTION

Figure 1A:
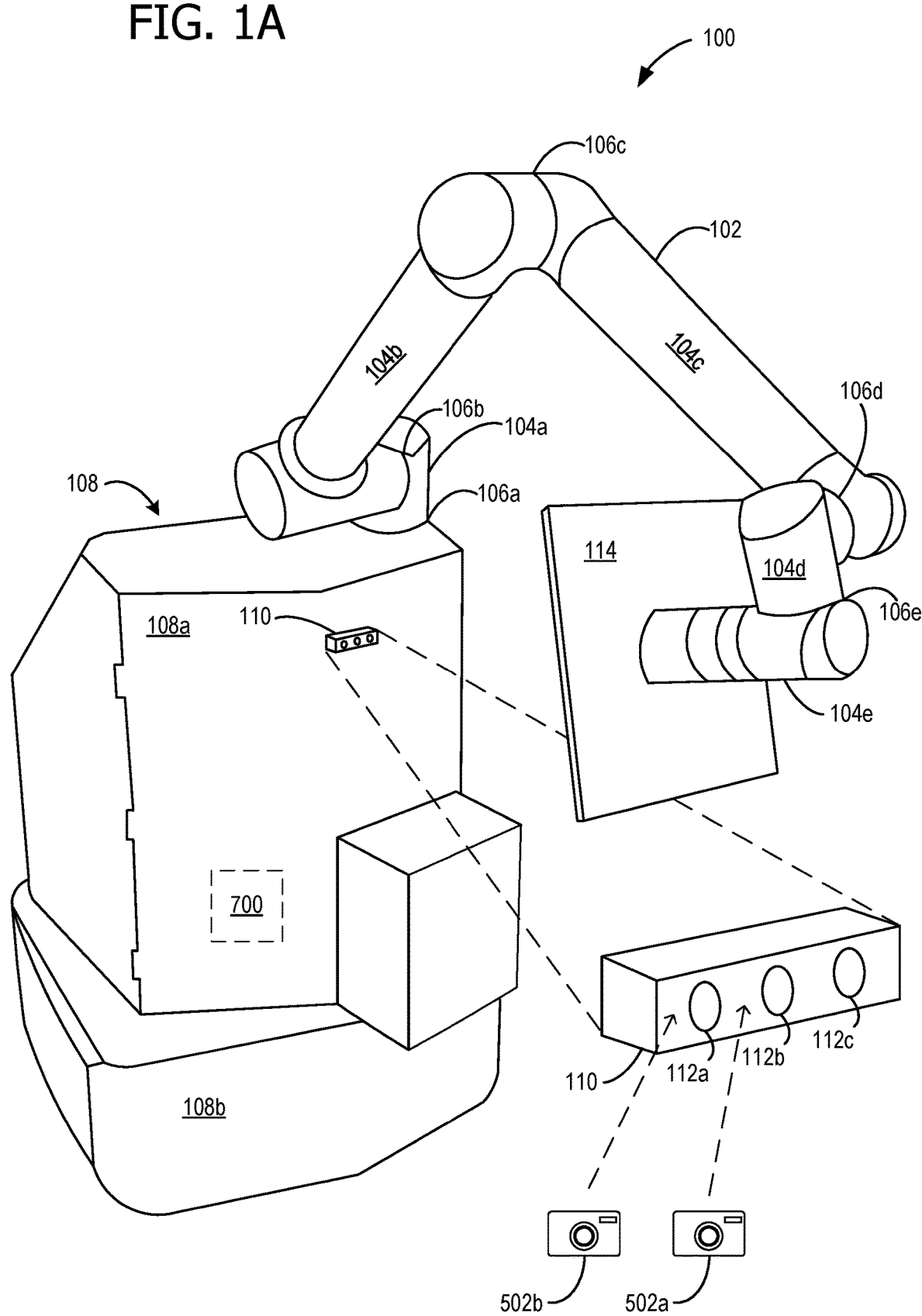
FIG. 1A is a frontal view of a robot 100.

The various implementations will be described in detail with reference to the accompanying drawings. Wherever possible, the same reference numbers will be used throughout the drawings to refer to the same or like parts. References made throughout this disclosure relating to specific implementations and implementations are provided solely for illustrative purposes but, unless indicated to the contrary, are not meant to limit all implementations.

The foregoing summary, as well as the following detailed description of certain implementations will be better understood when read in conjunction with the appended drawings. As used herein, an element or step recited in the singular and preceded by the word "a" or "an" should be understood as not necessarily excluding the plural of the elements or steps. Further, references to "one implementation" are not intended to be interpreted as excluding the existence of additional implementations that also incorporate the recited features. Moreover, unless explicitly stated to the contrary, implementations "comprising" or "having" an element or a plurality of elements having a particular property could include additional elements not having that property.

Optical sensors, such as cameras, are used in some robotic applications, for example with computer vision (CV) applications that perform navigation, quality control (QC), and other functions on a detected object, such as those that are common in manufacturing and warehouse material handling. However, proper interpretation of the collected imagery by CV applications requires that the optical sensors be calibrated such that an object's actual position in the imagery is as close to the expected position as possible. This is required to achieve accurate localization of objects relative to an end effector. Embodiments described herein consider these and other factors. A technical effect of embodiments herein include a reduced amount of time to calibrate a robotic application. A technical effect of embodiments herein include an increase in the accuracy of CV applications. A technical effect of embodiments herein include a reduced reliance on manual calibration.

There are two primary types of calibration: intrinsic and extrinsic. Extrinsic calibration parameters are also referred to as "extrinsic calibration values" and/or "extrinsic calibration parameter values." Intrinsic calibration parameters are also referred to as "intrinsic calibration parameters" and/or "intrinsic calibration parameter values." Intrinsic calibration, as used herein, relates generally to compensating for artifacts inherit in the camera system, such as for example, inconsistencies such as optical aberrations inherent in the lens. Intrinsic calibration parameters attempt to negate or account for the effects of the inconsistences. Typically, the intrinsic calibration parameters for an optical sensor lens are calculated in a lab environment by manually capturing a first dataset of images in ideal conditions. Each image contains a detectable known-size fiducial such as a chessboard or a charuco board. Once the data are captured, each image is processed individually to find the location of the fiducial key points. The set of measured fiducial key points is then correlated to a set of nominal fiducial board points. An optimization method, such as, for example a Levenberg-Marquardt optimization, is used to solve the optical parameters of the lens.

Extrinsic calibration, as used herein, relates generally to determining a set of values to define a transformation from sensor coordinates to a robot coordinate system. Typically, this involves mapping the kinematic movement of an end effector of the robot relative to the sensor (e.g., hand/eye coordination calibration). For example, the mapping can be modeled as AX=XB where A and B are sensor measurements from different positions and X is an unknown transformation that correlates the sensor measurements with different positions in space. Any approach may be used to arrive at the transformation as is known in the art. The extrinsic calibration parameters of an optical sensor mounting position are also typically calculated in a lab environment by manually capturing a second dataset of images in ideal conditions after having already completed the intrinsic calibration process. Because the intrinsic calibration had already been completed, each image is undistorted and the location of each fiducial is determined using, for example, Perspective-n-Point (PnP) optimization. PnP involves estimating the pose of an intrinsically calibrated optical sensor given a set of n 3D points in the world and their corresponding 2D projections in the image. The optical sensor pose, also known as the extrinsic calibration, consists of 6 degrees-of-freedom (DOF) which are made up of the rotation (roll, pitch, and yaw) and 3D translation (e.g., X, Y, and Z) of the optical sensor with respect to the world.

During use of a robot, various environmental factors (e.g., vibration), lens contamination, sensor inaccuracies, drift, asynchronicity, occlusions, and bumping an optical sensor, often trigger the need for recalibration. Unfortunately, these procedures are manual, and require separate image collections in two stages.

Aspects and implementations disclosed herein are directed at automatic intrinsic and extrinsic calibration for a robot optical sensor. An implementation includes an optical sensor; a robot arm; a calibration chart; one or more processors; and a memory storing instructions that cause the one or more processors to perform operations that includes: determining a set of poses for calibrating the first optical sensor; generating, based at least on the set of poses, pose data comprising three dimensional (3D) position and orientation data; moving, based at least on the pose data, the robot arm into a plurality of poses; at each pose of the plurality of poses, capturing a set of images of the calibration chart with the first optical sensor; calculating intrinsic calibration parameters, based at least on the set of captured images; and calculating extrinsic calibration parameters, based at least on the set of captured images.

One implementation involves attaching a calibration end effector (an end effector with a known pattern on a calibration chart) to a robot arm. A suitable set of poses is determined that provides a uniform spread of calibration board perspectives for the camera. The robot arm is then automatically moved to each pose and an image is captured and recorded along with the position and orientation of the calibration chart. The resulting set of images is used to calculate the intrinsic lens calibration. Following this, the lens calibration is used to undistort each image and the exact pose of the calibration chart is determined for each image. With the measured pose of the calibration chart, and the recorded robot arm pose for each image, two sets of transforms are constructed. These transform lists are then used to solve the AX=XB optimization problem, thereby solving the extrinsic calibration of the optical sensor—with a single set of images. This speeds up the calibration process, resulting in less robot downtime and better utilization, and is applicable to multiple scenarios involving mobile manipulator robots, such manufacturing, maintenance, and warehouse operation.

Figure 1B:
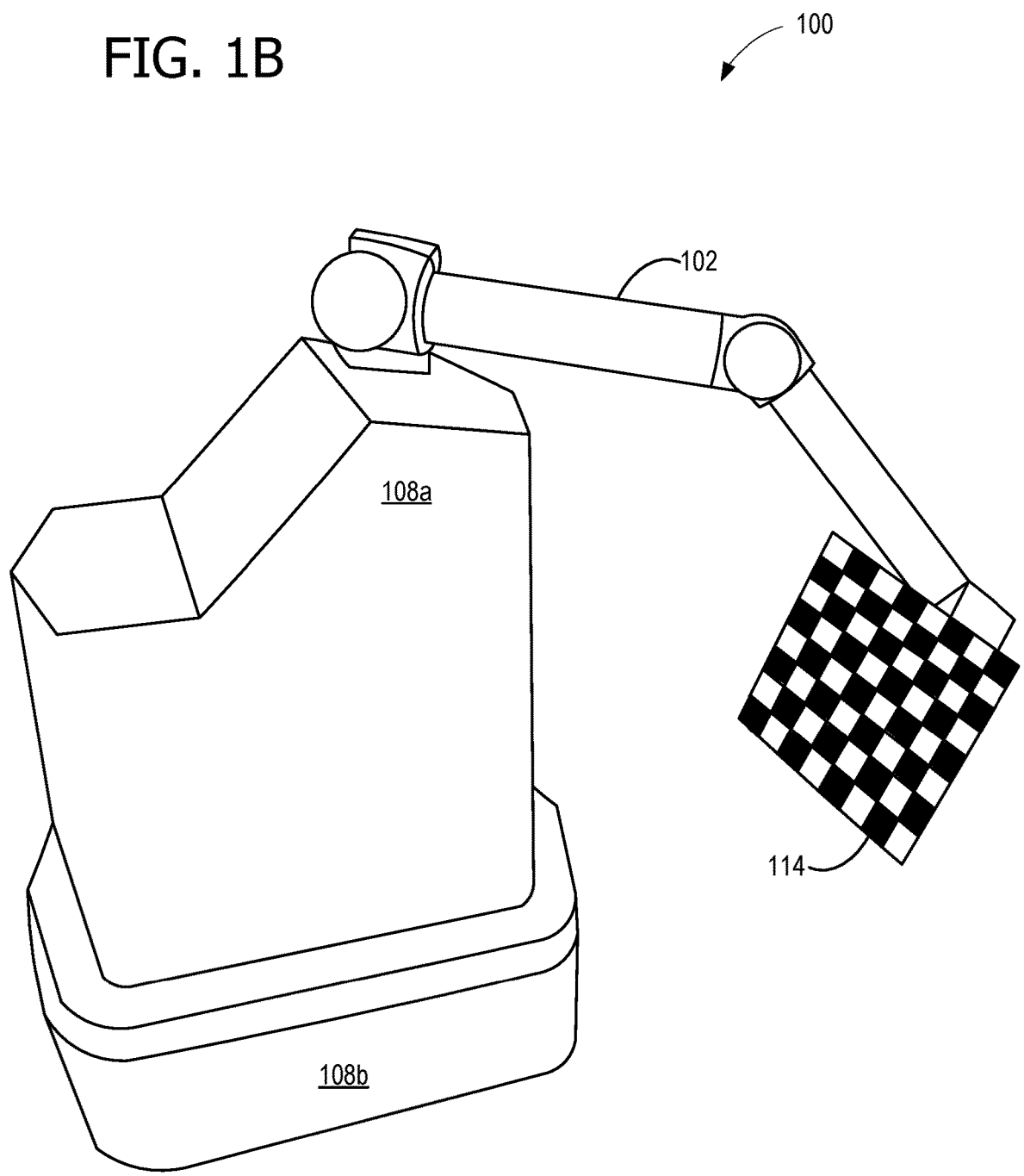
FIG. 1B is a side view of the robot 100.

Referring more particularly to the drawings, FIG. 1A is a frontal view of a robot 100, and FIG. 1B is a side view of the robot 100. The robot 100 has a robot arm 102 which has multiple segments 104a-104e, and multiple joints 106b-106e between the segments 104a-104e. A joint 106a connects the segment 104a of the robot arm 102 to a robot body 108. As illustrated, the robot body 108 has a top segment 108a that rotates on a base 108b. By manipulating the positions (e.g., by swiveling the joints 106a-106e), the robot arm 102 is moveable into a number of positions with various orientations. Some implementations of robot arm 102 have six degrees of freedom (6DoF) with 3D position (e.g., X, Y, and Z translation along Cartesian axes) control and also 3D orientation control (e.g., roll, pitch, and yaw). A controller 700, which is described in more detail with respect to FIG. 7, controls the operations of the robot 100.

An optical sensor housing 110 is illustrated as mounted to the front of the top segment 108a of the robot body 108, although in another implementation, the optical sensor housing 110 is mounted on the robot arm 102. The optical sensor housing 110 is illustrated as having three apertures, 112a-112c, although it should be understood that a different number of apertures are used on alternative implementations. A first robot optical sensor 502a is behind the middle aperture 112b. A second robot optical sensor 502b is behind the aperture 112a. Another optical sensor, or an illuminator (e.g., an LED), is behind the aperture 112c. In one implementation, the robot optical sensors 502a and 502b are cameras operating on visible light wavelengths. In some implementation, the robot optical sensors 502a and 502b operate outside visible light wavelengths, for example infrared (IR). In some implementations, the robot optical sensors 502a and 502b each operate on different wavelengths. The use of dual sensors permits stereo imagery and also comparison, for example, the need for recalibration is be determined by comparing the outputs of the robot optical sensors 502a and 502b with each other. An end effector 114 is in place for holding a calibration chart 300, which is described in more detail in relation to FIG. 3.

Figure 3:
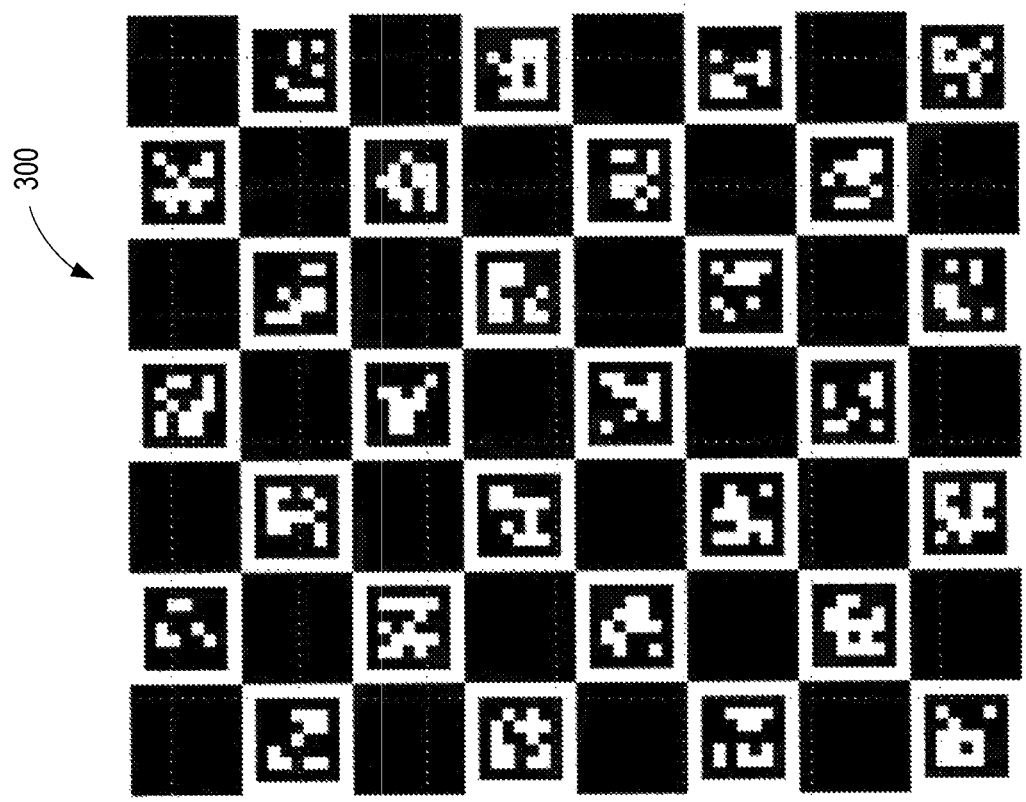
FIG. 3 illustrates a calibration chart 300.
Figure 2:
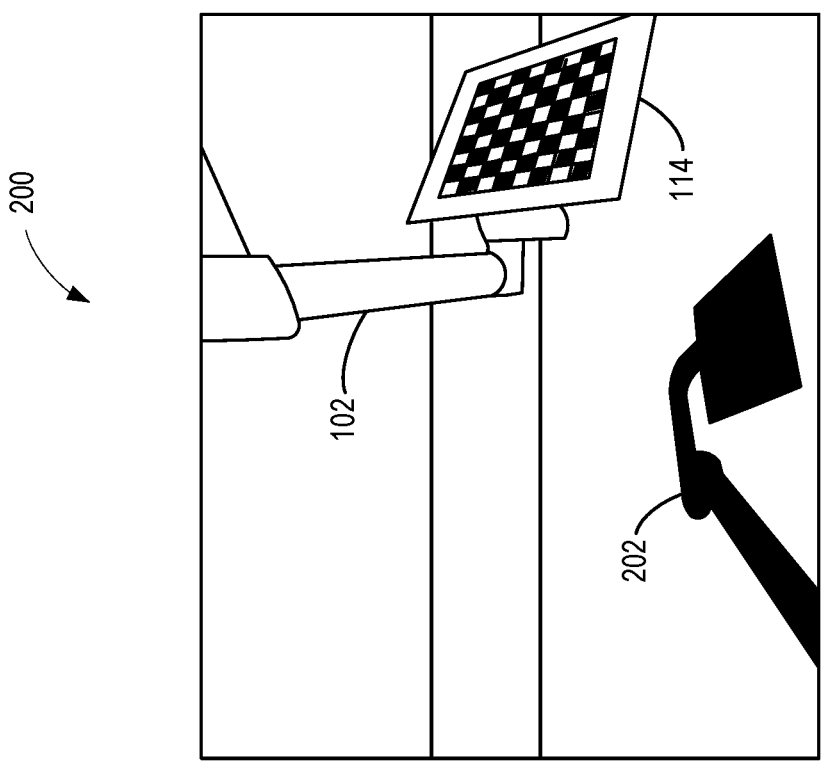

FIG. 2 illustrates a view 200 from the robot optical sensor 502a, when the robot arm 102 is in a position similar to that illustrated in FIG. 1B. The view 200 includes the robot arm 102, a shadow 202 of the robot arm, and the end effector 114. The end effector 114 illustrated in FIGS. 1B and 2 has a checkerboard pattern, although a 7×8 charuco calibration board pattern, shown as calibration chart 300 in FIG. 3, is used in some implementations. A charuco board combines an ArUco pattern with a checkerboard (a.k.a. chessboard), and provides an additional number of edges and shapes to improve alignment accuracy. For example, the charuco board of FIG. 3 is not rotationally symmetric.

Figure 4:
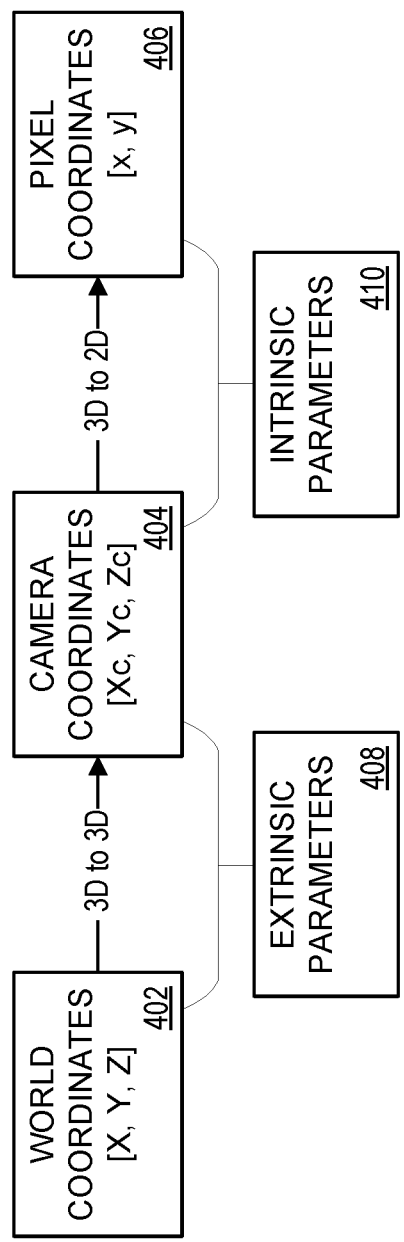
FIG. 4 illustrates relationships among various coordinates.

FIG. 4 illustrates a set 400 of relationships among various coordinates. World coordinates 402 describe the location of some object in a global frame of reference, whereas camera coordinates 404 describe the location of the object relative to the focal point of a camera or other sensor (e.g., the robot optical sensor 502a). The world coordinates 402 and the camera coordinates 404 are related by a 3D to 3D transform. With a 3D to two-dimensional (2D) mapping, the camera coordinates 404 specify 2D pixel coordinates 406, which indicate the location of the object within an image. Extrinsic calibration parameters 408 relate the world coordinates 402 with the camera coordinates 404, and intrinsic calibration parameters 410 relate the camera coordinates 404 with the pixel coordinates 406.

Figure 5:
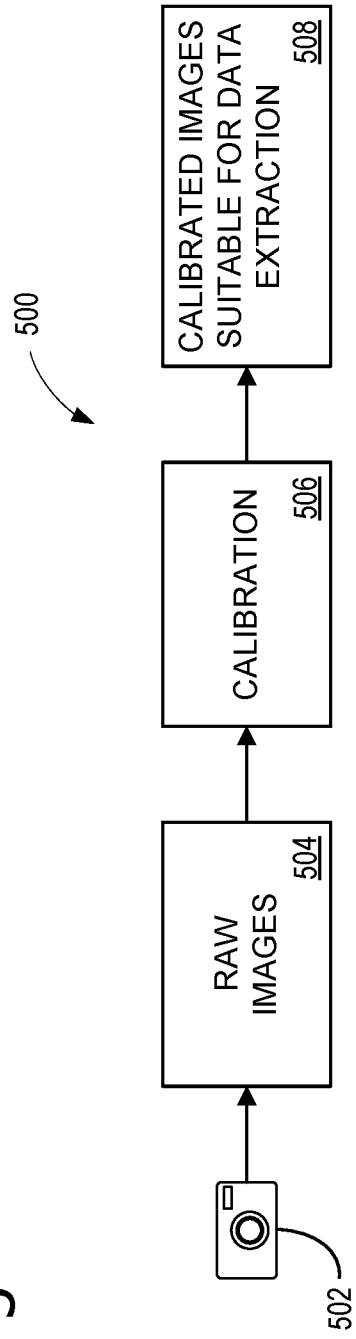
FIG. 5 illustrates a process 500 for translating output of a generic optical sensor 502 into calibrated images 508 (image rectification).

FIG. 5 illustrates a process 500 for translating output of a generic optical sensor 502 into calibrated images 508. Various specific implementations of the optical sensor 502 include the robot optical sensor 502a and the robot optical sensor 502b. The optical sensor 502 outputs raw images 504. A calibration operation 506, operating on the raw images 504 produces calibrated images 508 that are suitable for data extraction (e.g., in a CV application). In general, intrinsic calibration is associated with removing lens distortion to produce a correct looking image. Intrinsic calibration parameters are also used to project from 2D to 3D coordinates (e.g., determining where an object is within a room, based on where it is within an image). Extrinsic calibration is associated with locating a sensor optical plane with reference to an external frame (e.g., a robot frame or mount point).

Figure 6:
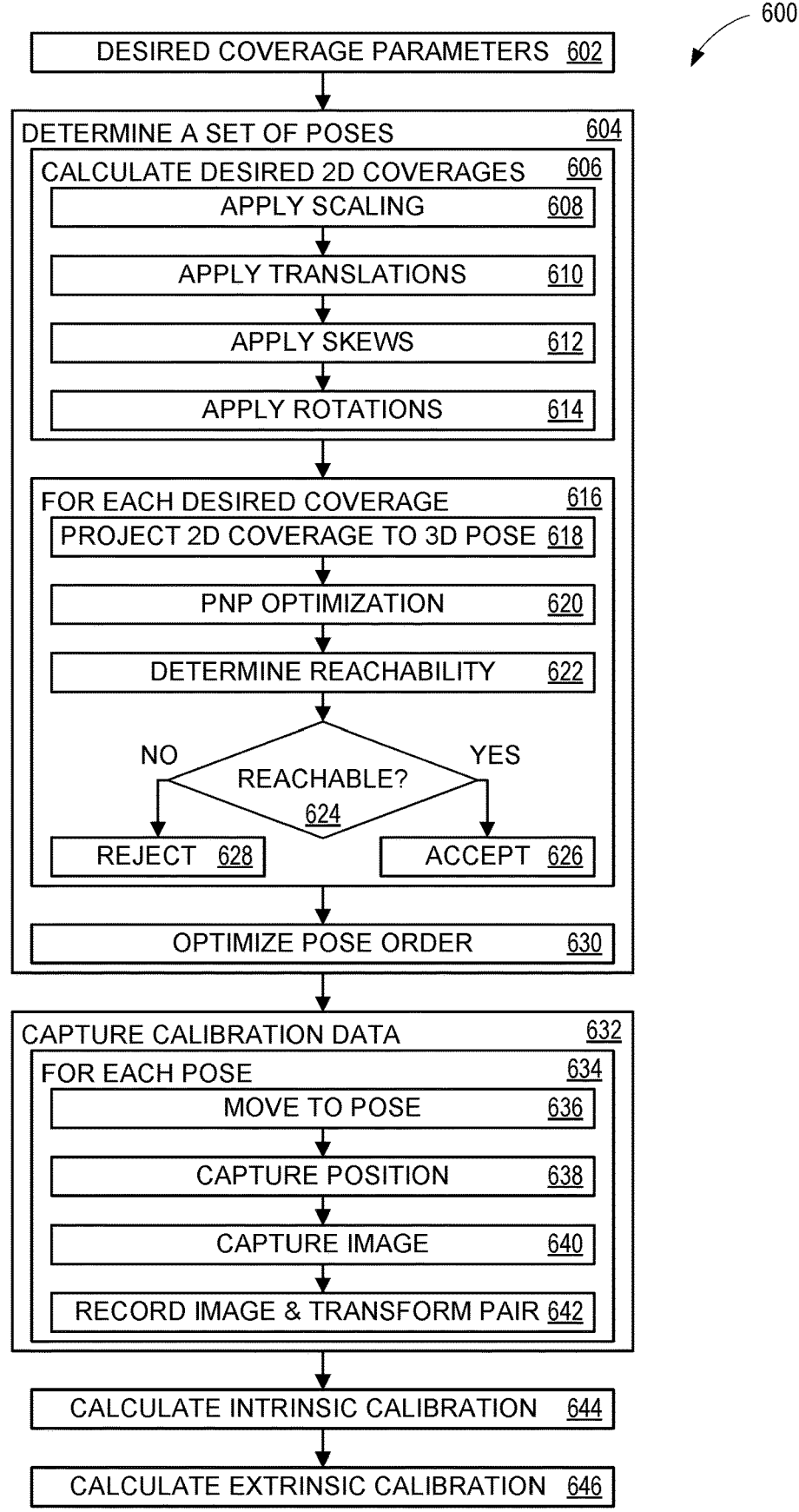

FIG. 6 is a block diagram illustrating a process 600 for automatic intrinsic and extrinsic calibration for the robot optical sensor 502a. Desired coverage parameters are determined in operation 602. In one implementation, this includes a desired calibration accuracy. A set of poses is determined in operation 604. In one implementation, a uniform spread of calibration board perspectives across the field of view (e.g., the resulting image extent) of the robot optical sensor 502a, is determined. One implementation uses an algorithm to automatically determine poses for an effective distribution of perspectives of the calibration chart 300 across the dataset of collected images. This eliminates the need to manually capture a dataset, and provides a more uniformly distributed dataset which contributes to optimization.

Operation 604 includes multiple operations 606-630. In operation 606, the 2D coverage within the field of view of the robot optical sensor 502a, is determined. Scaling is applied in operation 608, translations are applied in operation 610, skews are applied in operation 612, for example, to de-skew image data, and rotations are applied in operation 614. Operation 616 then refines the poses, in operations 618-628. The 2D coverage is converted into a 3D pose in operation 618, and operation 620 included PnP optimization. Reachability is determined in operation 622, using inverse kinematics. Inverse kinematics refers to the use of the kinematics equations of the robot arm 102 to determine the joint parameters that provide a desired position of the end-effector 114. Specification of the movement of the robot arm 102 so that the end-effector 114 achieves a desired task is known as motion planning. Inverse kinematics transforms the motion plan into joint actuator trajectories for the robot arm 102. If a pose is reachable, as determined in decision operation 624, it is accepted into (retained in) the set of poses in operation 626; otherwise it is rejected in operation 628. In one implementation, determining reachability includes both determining whether the robot arm 102 is able to move into the defined position and also that the calibration chart 300 is within the view of the robot optical sensor 502a. Pose order is optimized in operation 630, for example, by minimizing the motion required for the robot arm to pass through all of the poses.

Calibration data is captured in operation 632, which includes operations 634-642. Operation 634 iterates through each pose in the set of poses. Operation 636 includes moving, based at least on the pose data, the robot arm 102 into each of the plurality of poses. Operation 638 includes capturing position data of the calibration chart 300, based on where the robot arm has moved the end effector 114. Images are captured in operation 640, and operation 642 includes recording image and transform pairs. The image data set is now available for use in calibration. Operation 644 includes calculating the intrinsic calibration parameters 410, and operation 646 includes calculating the extrinsic calibration parameters 408. The overview of the process is that the intrinsic calibration parameters 410 are computed from the image set and known properties of the calibration chart 300; the intrinsic calibration is applied to undistort the captured images; marker detection is applied to the undistorted images, and the marker detection results are compared with the earlier recorded position (from operation 638) using an optimizer, thereby producing the extrinsic calibration parameters 408.

More specifically, intrinsic lens distortion calibration values are solved using the captured data (e.g., using Levenberg-Marquardt optimization comparing measured calibration board key-points with a nominal set). Images are then be undistorted. The position of the end effector 114 (holding the calibration chart 300) in each image is calculated using PnP optimization. Each pose is paired with the corresponding calculated position, with respect to the robot optical sensor 502a. In one implementation, the mounting position of the robot optical sensor 502a is solved by solving the AX=XB problem using for example, a dual-quaternion method Pose Generation Algorithm.

Figure 7:
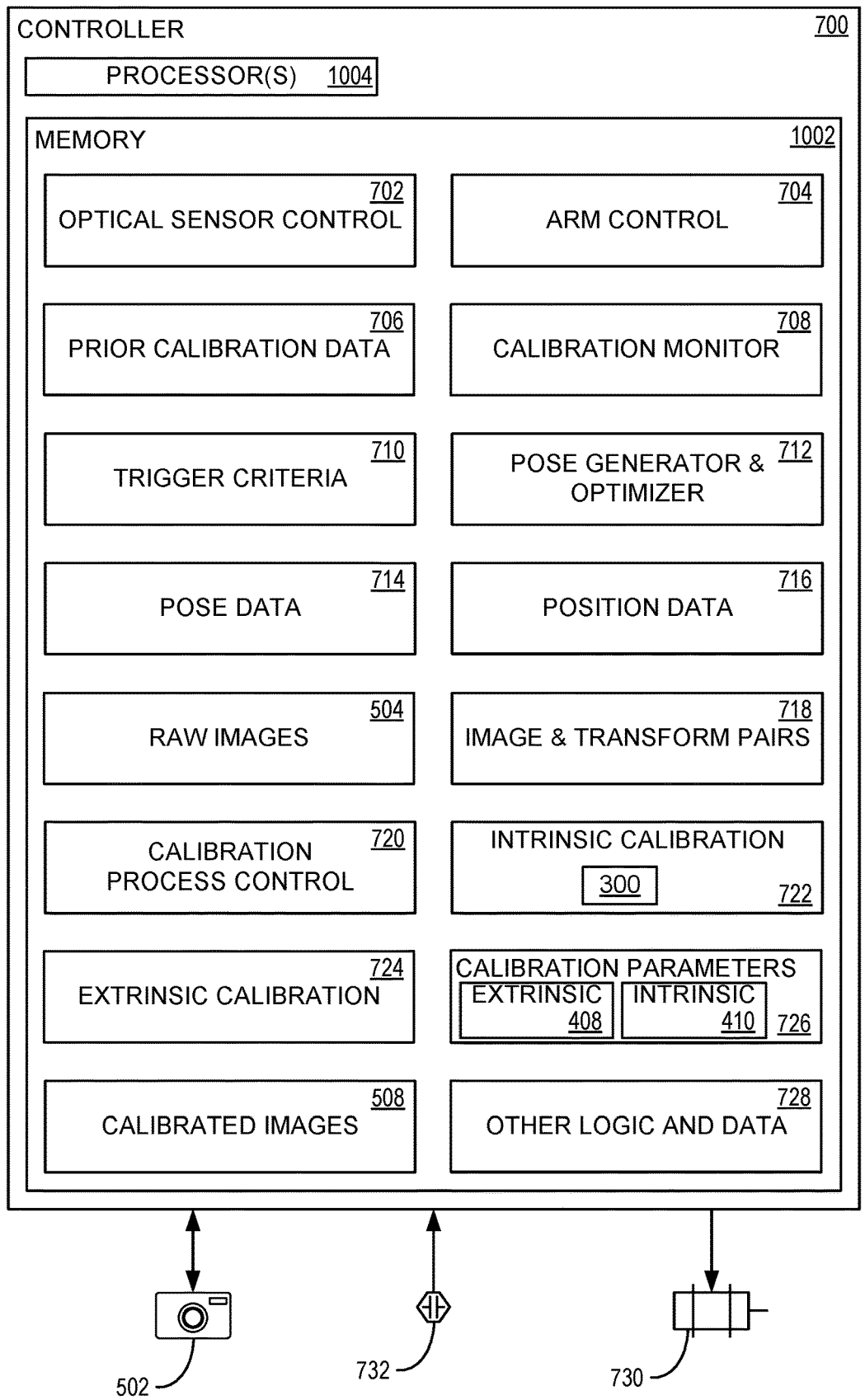

FIG. 7 is a block diagram illustrating a controller 700 for automatic intrinsic and extrinsic calibration for the robot optical sensor 502a. In one implementation, the controller 700 is located within the robot body 108 of the robot 100. (See FIG. 1A.) In one implementation, the controller 700 is a manifestation of a computing device 1000, which is described in more detail with respect to FIG. 10. The controller 700 includes one or more processors 1004 coupled to a memory 1002. The controller 700 is coupled to the optical sensor 502, which represents the robot optical sensor 502a and/or the robot optical sensor 502b. The controller 700 is also coupled to position sensors 732, which sense the position and orientation of the robot arm 102

(specifically the segments 104a-104e, the joints 106a-106e, and the end effector 114). Position data 716, which is captured in operation 638 (of FIG. 6) is captured by the position sensors 732. The controller 700 is also coupled to robot arm servo motors 730, which move the robot arm 102 by moving the joints 106a-106e.

The memory 1002 includes instruction executable by processors 1004 as well as stored data. The memory 1002 includes optical sensor control 702, which controls the robot optical sensors 502a and 502b. The memory also includes robot arm control 704, which controls the robot arm servo motors 730 using feedback from the position sensors 732, to position the end effector 114 in a specified pose (e.g., specified 3D position and orientation). The memory also includes prior calibration data 706 which is used as the baseline or default calibration for the images collected during the calibration procedures described herein. In one implementation, prior calibration data 706 is replaced with default calibration data. A calibration monitoring component 708 determines a calibration trigger event in accordance with trigger criteria 710, for example by comparing calculated object positions from different images or monitoring a timer. A pose generator and optimizer component 712 produces pose data 714 for moving the robot arm 102 during the calibration procedure.

The raw images 504 images are output from the optical sensor 502 at the various poses, and used for calibration, which also uses image and transform pairs 718 that had been recorded in operation 642. A calibration process control 720 performs the intrinsic and extrinsic calibrations using intrinsic calibration support data 722 and extrinsic calibration support data 724, which contain the logic and data necessary to perform the calculations described herein. The intrinsic calibration support data 722 also includes data for the calibration chart 300. Calculated calibration parameters 726, including both the extrinsic calibration parameters 408 and the intrinsic calibration parameters 410, are also within the memory 1002. The memory 1002 also holds the resulting calibrated images 508 and other logic and data 728 that is necessary to carry out the operations described herein.

Figure 8:
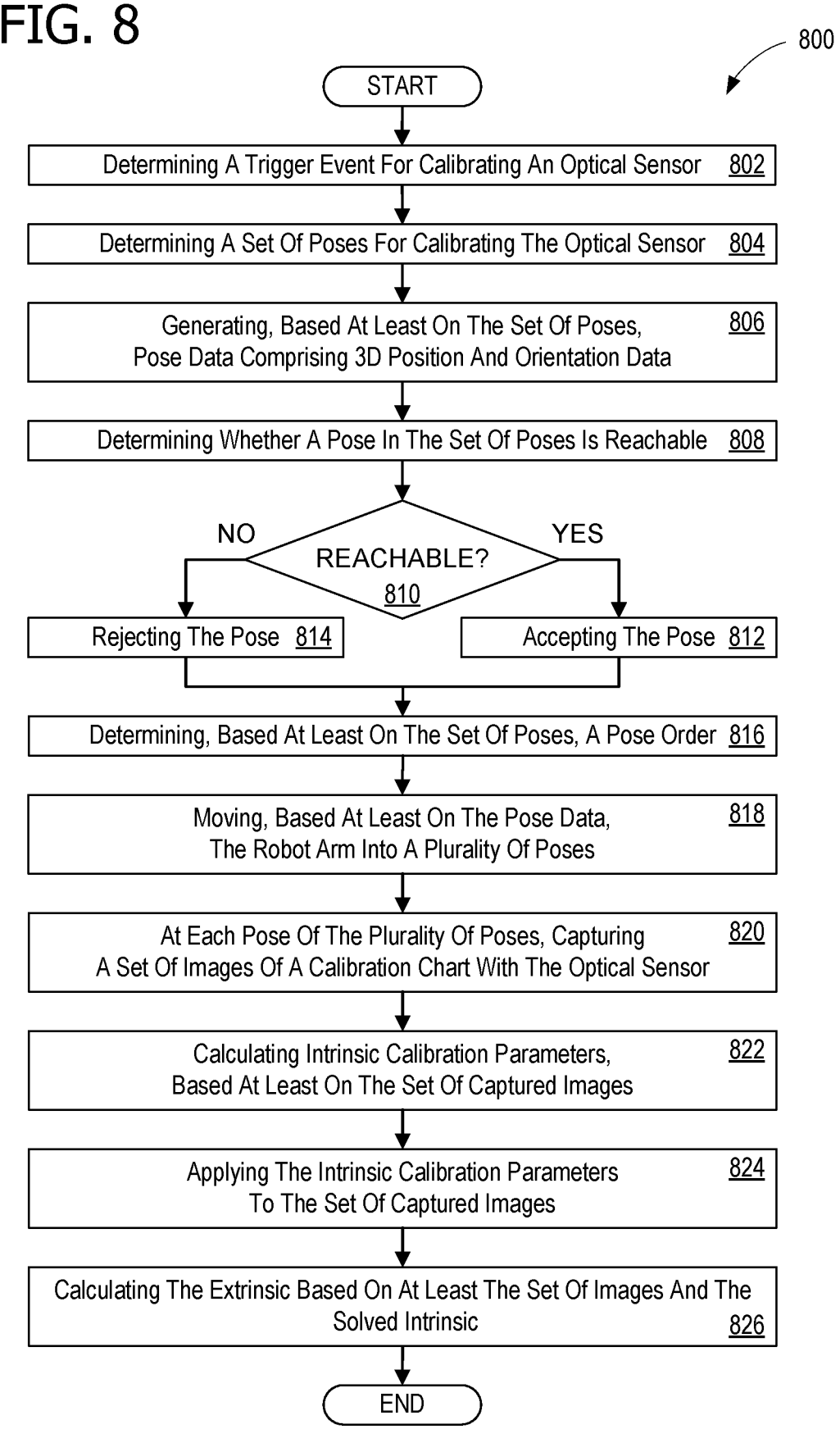

With reference now to FIG. 8, a flow chart 800 illustrates an implementation of an operation for automatic calibration of the robot optical sensor 502a. In one implementation, the operations illustrated in FIG. 8 are performed, at least in part, by executing instructions by the one or more processors 1004. Operation 802 includes determining a trigger event for calibrating the robot optical sensor 502a. In one implementation, operation 802 includes comparing images captured with the robot optical sensor 502a with images captured with the robot arm optical sensor 502b. For example, the position of an object is calculated using a CV algorithm operating on images from the robot optical sensor 502a, and the position of the same object is calculated using the CV algorithm operating on images from the robot optical sensor 502b. If the calculated positions differ by more than some threshold event, then this is a determined trigger event. In one implementation, a trigger event is the lapse of a timer. In one implementation, a trigger event is a user input. In one implementation, a trigger event is detecting damage to a workpiece or unexpected physical resistance to an operation that is controlled by CV.

Operation 804 includes determining a set of poses for calibrating the robot optical sensor 502b. In one implementation this includes at least some of the operations described for operation 604 (of FIG. 6). Operation 806 includes generating, based at least on the set of poses, the pose data 714 comprising 3D position and orientation data. Using the position and orientation data, operation 808 includes determining whether a pose in the set of poses is reachable. In one implementation, determining reachability includes both determining whether the robot arm 102 is able to move into the defined position and also that the calibration chart 300 is within the view of the robot optical sensor 502a. Based at least on the pose being reachable, according to decision operation 810, operation 812 includes accepting the pose. Based at least on the pose not being reachable, according to decision operation 810, operation 814 includes rejecting the pose. Operation 816 then includes determining, based at least on the set of poses, a pose order. In one implementation, the poses are sequenced in a manner that minimizes the total motion of the robot arm 102, so that the robot arm 102 is not moving back and forth unnecessarily.

Operation 818 includes moving, based at least on the pose data, the robot arm into a plurality of poses. For example, a set of poses are selected to provide images of the calibration chart 300 at a preferred range of distances (from up close to a maximum distance with a minimum number of transition steps), a range of orientations (from a first angle to a second angle with a minimum number of transition steps); a range of positions in both horizontal and vertical translation, and so on, to provide comprehensive coverage (with no appreciable gaps) for the 6DoF of the end effector 114. For example, at a given range and translation position, the end effector 114 holding the calibration chart 300 is stepped through a range or orientation angles in each of roll, pitch, and yaw, with a sufficient number of transition angles in each orientation dimension to avoid gaps. Then, the end effector 114 is moved to a different translation position and the orientation variations are again stepped through. This is repeated until sufficient imagery covers the range of reachable 6DoF.

At each pose of the plurality of poses, operation 820 includes capturing a set of images of the calibration chart 300 with the robot optical sensor 502b. In one implementation, the calibration chart 300 is attached to the end effector 114 of the robot arm 102, and the robot optical sensor 502b is mounted on the robot body 108. In one implementation, the robot optical sensor 502b is mounted on the robot arm 102 (e.g., on the end effector 114), and thus the robot optical sensor 502b moves with the robot arm 102. In such an implementation, the calibration chart 300 is placed elsewhere, such as on a wall in a known location, or on the robot body 108.

Operation 822 includes calculating the intrinsic calibration parameters 410, based at least on the set of captured images. Operation 824 applying the intrinsic calibration parameters 410 to the set of captured images, and operation 826 includes calculating the extrinsic calibration parameters 408, based at least on the set of captured images.

Figure 9:
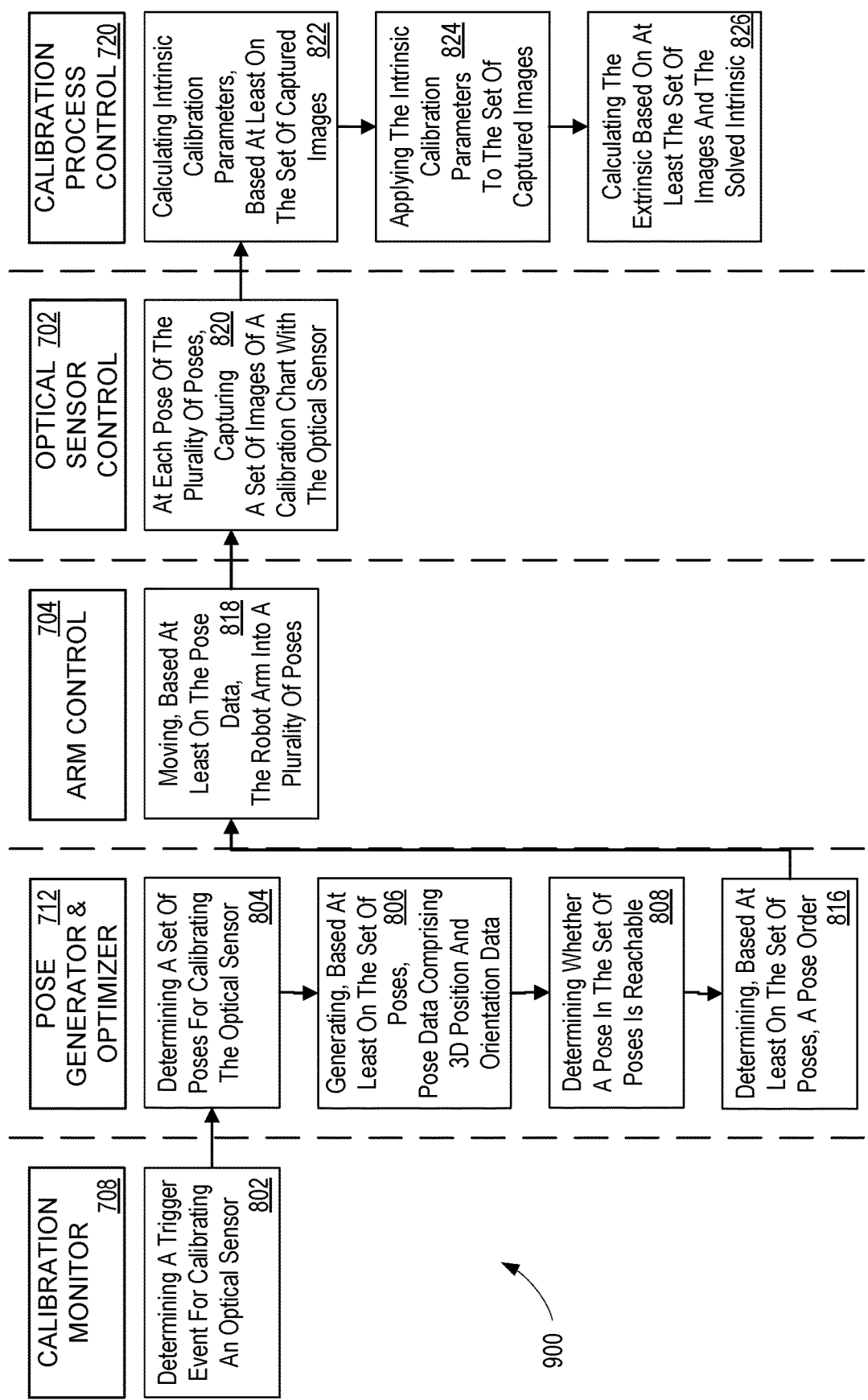

FIG. 9 is a block diagram illustrating a process 900 for automatic intrinsic and extrinsic calibration for the robot optical sensor 502a. Specifically, the process 900 identifies the elements within the controller 700 that perform the various operations of the flow chart 800, in one implementation. The calibration monitoring component 708 performs operation 802. The pose generator and optimizer component 712 performs operations 804-806. The robot arm control 704 performs operation 818, and the optical sensor control 702 performs operation 820. Finally, the calibration process control 720 performs operations 822-826.

Figure 10:
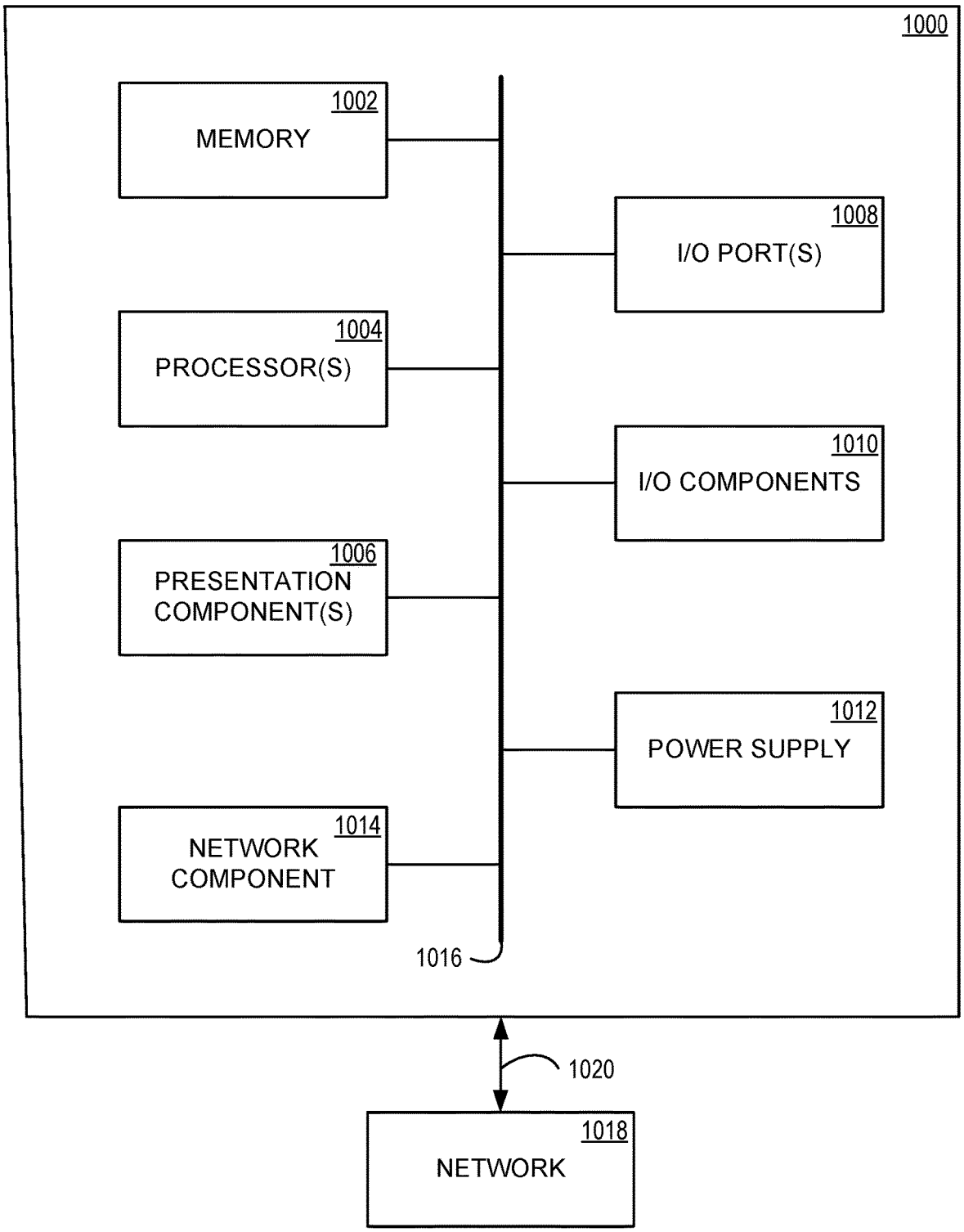
FIG. 10 is a block diagram of a computing device 1000 suitable for implementing various aspects of the disclosure.

With reference now to FIG. 10, a block diagram of the computing device 1000 suitable for implementing various aspects of the disclosure is provided. In some implementations, the computing device 1000 includes one or more processors 1004, one or more presentation components 1006 and the memory 1002. The disclosed implementations associated with the computing device 1000 are practiced by a variety of computing devices, including personal computers, laptops, smart phones, mobile tablets, hand-held devices, consumer electronics, specialty computing devices, etc. Distinction is not made between such categories as "workstation," "server," "laptop," "hand-held device," etc., as all are contemplated within the scope of FIG. 10 and the references herein to a "computing device." The disclosed implementations are also practiced in distributed computing environments, where tasks are performed by remote-processing devices that are linked through a communications network. Further, while the computing device 1000 is depicted as a seemingly single device, in one implementation, multiple computing devices work together and share the depicted device resources. For instance, in one implementation, the memory 1002 is distributed across multiple devices, the processor(s) 1004 provided are housed on different devices, and so on.

In one implementation, the memory 1002 includes any of the computer-readable media discussed herein. In one implementation, the memory 1002 is used to store and access instructions configured to carry out the various operations disclosed herein. In some implementations, the memory 1002 includes computer storage media in the form of volatile and/or nonvolatile memory, removable or non-removable memory, data disks in virtual environments, or a combination thereof. In one implementation, the processor(s) 1004 includes any quantity of processing units that read data from various entities, such as the memory 1002 or input/output (I/O) components 1010. Specifically, the processor(s) 1004 are programmed to execute computer-executable instructions for implementing aspects of the disclosure. In one implementation, the instructions are performed by the processor, by multiple processors within the computing device 1000, or by a processor external to the computing device 1000. In some implementations, the processor(s) 1004 are programmed to execute instructions such as those illustrated in the flow charts discussed below and depicted in the accompanying drawings.

The presentation component(s) 1006 present data indications to an operator or to another device. In one implementation, presentation components 1006 include a display device, speaker, printing component, vibrating component, etc. One skilled in the art will understand and appreciate that computer data is presented in a number of ways, such as visually in a graphical user interface (GUI), audibly through speakers, wirelessly between the computing device 1000, across a wired connection, or in other ways. In one implementation, presentation component(s) 1006 are not used when processes and operations are sufficiently automated that a need for human interaction is lessened or not needed. I/O ports 1008 allow the computing device 1000 to be logically coupled to other devices including the I/O components 1010, some of which is built in. Implementations of the I/O components 1010 include, for example but without limitation, a microphone, keyboard, mouse, joystick, game pad, satellite dish, scanner, printer, wireless device, etc.

The computing device 1000 includes a bus 1016 that directly or indirectly couples the following devices: the memory 1002, the one or more processors 1004, the one or more presentation components 1006, the input/output (I/O) ports 1008, the I/O components 1010, a power supply 1012, and a network component 1014. The computing device 1000 should not be interpreted as having any dependency or requirement related to any single component or combination of components illustrated therein. The bus 1016 represents one or more busses (such as an address bus, data bus, or a combination thereof). Although the various blocks of FIG. 10 are shown with lines for the sake of clarity, some implementations blur functionality over various different components described herein.

In some implementations, the computing device 1000 is communicatively coupled to a network 1018 using the network component 1014. In some implementations, the network component 1014 includes a network interface card and/or computer-executable instructions (e.g., a driver) for operating the network interface card. In one implementation, communication between the computing device 1000 and other devices occur using any protocol or mechanism over a wired or wireless connection 1020. In some implementations, the network component 1014 is operable to communicate data over public, private, or hybrid (public and private) using a transfer protocol, between devices wirelessly using short range communication technologies (e.g., near-field communication (NFC), Bluetooth® branded communications, or the like), or a combination thereof.

Although described in connection with the computing device 1000, implementations of the disclosure are capable of implementation with numerous other general-purpose or special-purpose computing system environments, configurations, or devices. Implementations of well-known computing systems, environments, and/or configurations that are suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices accept input from the user in any way, including from input devices such as a keyboard or pointing device, via gesture input, proximity input (such as by hovering), and/or via voice input.

Implementations of the disclosure are described in the general context of computer-executable instructions, such as program modules, executed by one or more computers or other devices in software, firmware, hardware, or a combination thereof. In one implementation, the computer-executable instructions are organized into one or more computer-executable components or modules. Generally, program modules include, but are not limited to, routines, programs, objects, components, and data structures that perform particular tasks or implement particular abstract data types. In one implementation, aspects of the disclosure are implemented with any number and organization of such components or modules. For example, aspects of the disclosure are not limited to the specific computer-executable instructions or the specific components or modules illustrated in the figures and described herein. Other implementations of the disclosure include different computer-executable instructions or components having more or less functionality than illustrated and described herein. In implementations involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. In one implementation, computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium used to store information for access by a computing device. In contrast, communication media typically embody computer readable instructions, data structures, program modules, or the like in a modulated data signal such as a carrier wave or other transport mechanism and include any information delivery media.

Figure 11:
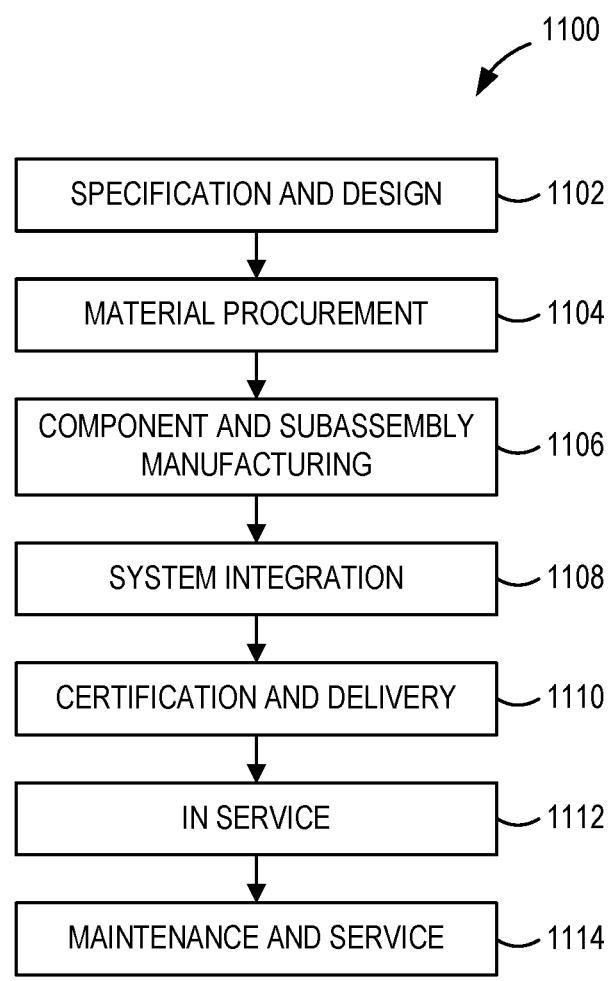
Figure 12:
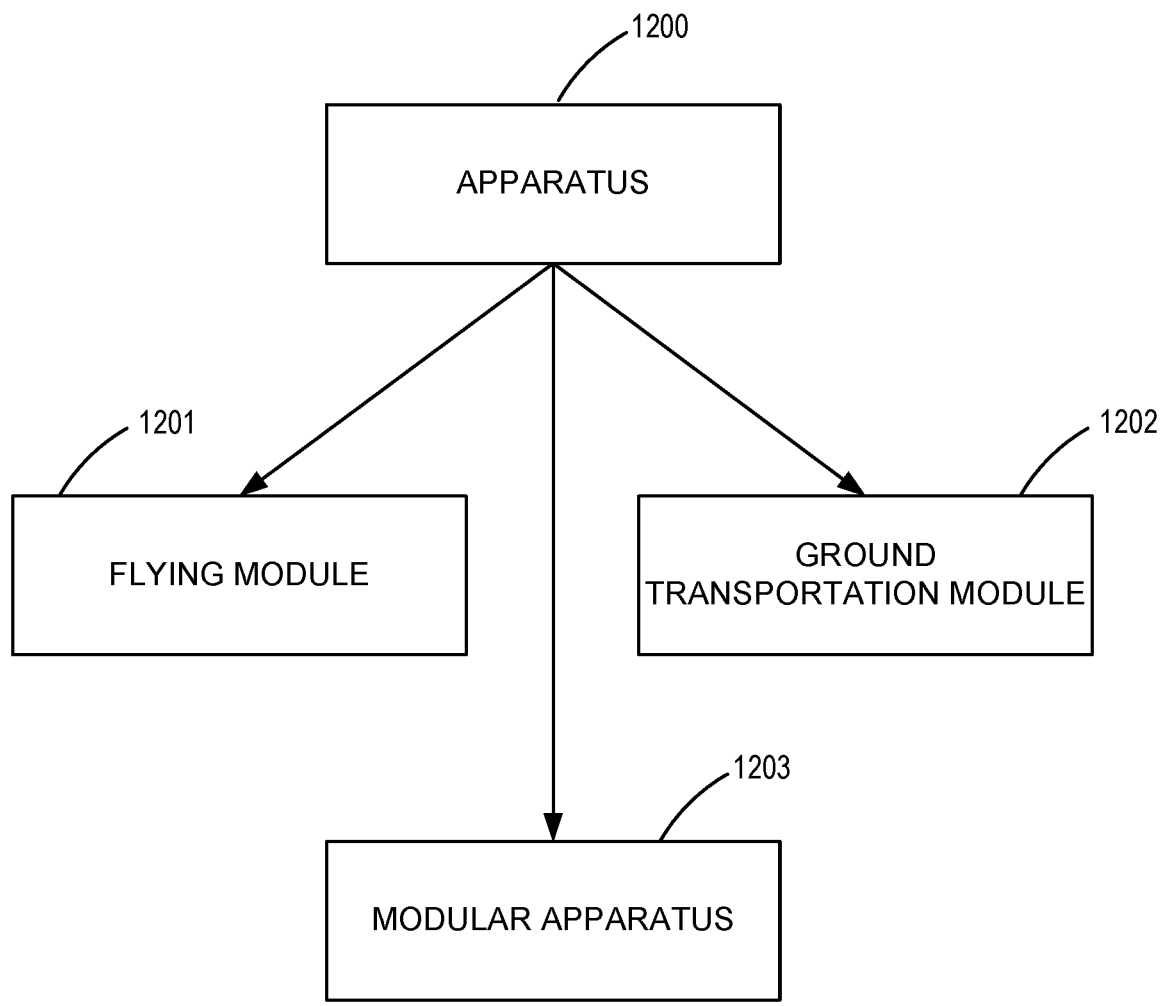
Figure 13:
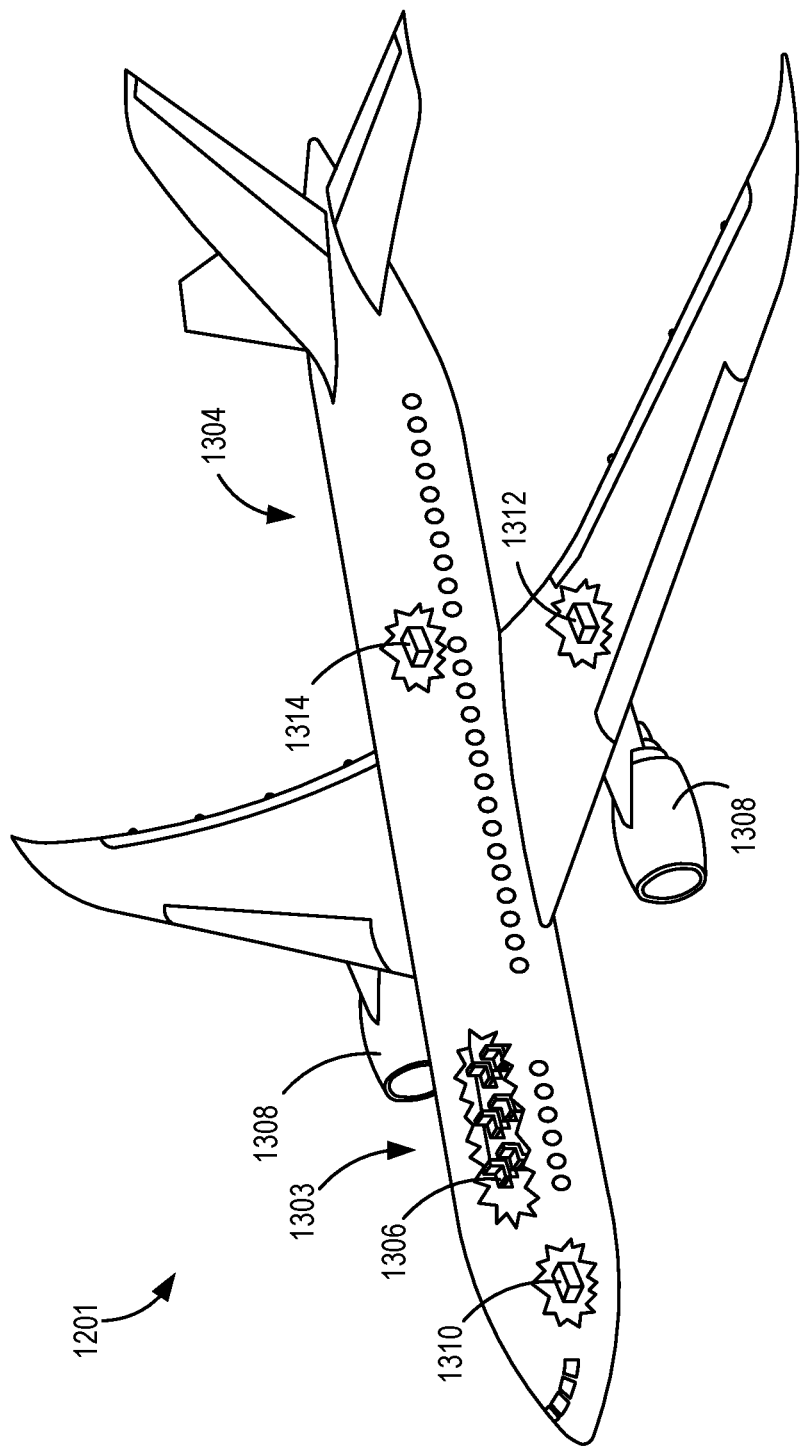
FIG. 13 is a schematic perspective view of a particular flying module 1201.

Some examples of the robot 100 (of FIGS. 1A and 1B) are used in manufacturing and service applications as shown and described in relation to FIGS. 11-13. Thus, implementations of the disclosure are described in the context of an apparatus of manufacturing and service method 1100 shown in FIG. 11 and apparatus 1200 shown in FIG. 12. In FIG. 11, a diagram illustrating an apparatus manufacturing and service method is depicted in accordance with an implementation. In one implementation, during pre-production, the apparatus manufacturing and service method 1100 includes specification and design 1102 of the apparatus 1200 in FIG. 12 and material procurement 1104. During production, component and subassembly manufacturing 1106 and system integration 1108 of the apparatus 1200 in FIG. 12 takes place. Thereafter, the apparatus 1200 in FIG. 12 goes through certification and delivery 1110 in order to be placed in service 1112. While in service by a customer, the apparatus 1200 in FIG. 12 is scheduled for routine maintenance and service 1114, which, in one implementation, includes modification, reconfiguration, refurbishment, and other maintenance or service described herein.

In one implementation, each of the processes of the apparatus manufacturing and service method 1100 are performed or carried out by a system integrator, a third party, and/or an operator. In these implementations, the operator is a customer. For the purposes of this description, a system integrator includes any number of apparatus manufacturers and major-system subcontractors; a third party includes any number of venders, subcontractors, and suppliers; and in one implementation, an operator is an owner of an apparatus or fleet of the apparatus, an administrator responsible for the apparatus or fleet of the apparatus, a user operating the apparatus, a leasing company, a military entity, a service organization, or the like.

With reference now to FIG. 12, the apparatus 1200 is provided. As shown in FIG. 12, an example of the apparatus 1200 is a flying apparatus 1201, such as an aerospace vehicle, aircraft, air cargo, flying car, and the like. As also shown in FIG. 12, a further example of the apparatus 1200 is a ground transportation apparatus 1202, such as an automobile, a truck, heavy equipment, construction equipment, a boat, a ship, a submarine and the like. A further example of the apparatus 1200 shown in FIG. 12 is a modular apparatus 1203 that comprises at least one or more of the following modules: an air module, a payload module and a ground module. The air module provides air lift or flying capability. The payload module provides capability of transporting objects such as cargo or live objects (people, animals, etc.). The ground module provides the capability of ground mobility. The disclosed solution herein is applied to each of the modules separately or in groups such as air and payload modules, or payload and ground, etc. or all modules.

With reference now to FIG. 13, a more specific diagram of the flying module 1201 is depicted in which an implementation of the disclosure is advantageously employed. In this example, the flying module 1201 is an aircraft produced by the apparatus manufacturing and service method 1100 in FIG. 11 and includes an airframe 1303 with a plurality of systems 1304 and an interior 1306. Implementations of the plurality of systems 1304 include one or more of a propulsion system 1308, an electrical system 1310, a hydraulic system 1312, and an environmental system 1314. However, other systems are also candidates for inclusion. Although an aerospace example is shown, different advantageous implementations are applied to other industries, such as the automotive industry, etc.

The implementations disclosed herein are described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed implementations are practiced in a variety of system configurations, including personal computers, laptops, smart phones, mobile tablets, hand-held devices, consumer electronics, specialty computing devices, etc. The disclosed implementations are also practiced in distributed computing environments, where tasks are performed by remote-processing devices that are linked through a communications network.

The following paragraphs describe further aspects of the disclosure:

A1. A system for automatic calibration of a robot optical sensor, the system comprising:
    an optical sensor;
    a robot arm;
    a calibration chart;
    one or more processors; and
    a memory storing instructions, that when executed by the one or more processors, cause the one or more processors to perform operations comprising:
        determining a set of poses for calibrating the optical sensor;
        generating, based at least on the set of poses, pose data comprising 3D position and orientation data;
        moving, based at least on the pose data, the robot arm into a plurality of poses;
        at each pose of the plurality of poses, capturing a set of images of the calibration chart with the optical sensor;
        calculating intrinsic calibration parameters, based at least on the set of captured images; and calculating extrinsic calibration parameters, based at least on the set of captured images.

A2. The system of A1 wherein the operations further comprise:
prior to calculating the extrinsic calibration parameters, applying the intrinsic calibration parameters to the set of captured images.

A3. The system of A1 wherein the operations further comprise:
determining whether a pose in the set of poses is reachable; and
based at least on the pose not being reachable, rejecting the pose.

A4. The system of A1 wherein the calibration chart is attached to an end effector of the robot arm, and wherein the optical sensor is mounted on a body of the robot.

A5. The system of A1 wherein the optical sensor is mounted on the robot arm.

A6. The system of A1 wherein the operations further comprise:
determining a trigger event for calibrating the optical sensor; and
wherein determining the set of poses for calibrating the optical sensor comprises:
based at least on the trigger event, determining the set of poses for calibrating the optical sensor.

A7. The system of A6 wherein the optical sensor is a first optical sensor, and wherein the system further comprises:
a second optical sensor; and
wherein determining the trigger event comprises comparing images captured with the first optical sensor with images captured with the second optical sensor.

A8. A method of automatic calibration of a robot optical sensor, the method comprising:
determining a set of poses for calibrating an optical sensor;
generating, based at least on the set of poses, pose data comprising 3D position and orientation data;
moving, based at least on the pose data, a robot arm into a plurality of poses;
at each pose of the plurality of poses, capturing a set of images of a calibration chart with the optical sensor;
calculating intrinsic calibration parameters, based at least on the set of captured images; and
calculating extrinsic calibration parameters, based at least on the set of captured images.

A9. The method of A8 further comprising:
prior to calculating the extrinsic calibration parameters, applying the intrinsic calibration parameters to the set of captured images.

A10. The method of A8 further comprising:
determining whether a pose in the set of poses is reachable; and
based at least on the pose not being reachable, rejecting the pose.

A11. The method of A8 wherein the calibration chart is attached to an end effector of the robot arm, and wherein the optical sensor is mounted on a body of the robot.

A12. The method of A8 wherein the optical sensor is mounted on the robot arm.

A13. The method of A8 further comprising:
determining a trigger event for calibrating the optical sensor; and
wherein determining the set of poses for calibrating the optical sensor comprises:
based at least on the trigger event, determining the set of poses for calibrating the optical sensor.

A14. The method of A13 wherein the optical sensor is a first optical sensor, and wherein determining the trigger event comprises:
comparing images captured with the first optical sensor with images captured with a second optical sensor.

A15. A computer product code having computer-executable instructions for automatically calibrating a robot optical sensor, which, on execution by a computer, cause the computer to perform operations comprising:
determining a set of poses for calibrating an optical sensor;
generating, based at least on the set of poses, pose data comprising 3D position and orientation data;
moving, based at least on the pose data, a robot arm into a plurality of poses;
at each pose of the plurality of poses, capturing a set of images of a calibration chart with the optical sensor;
calculating intrinsic calibration parameters, based at least on the set of captured images; and
calculating extrinsic calibration parameters, based at least on the set of captured images.

A16. The computer product code of A15 wherein the operations further comprise:
prior to calculating the extrinsic calibration parameters, applying the intrinsic calibration parameters to the set of captured images.

A17. The computer product code of A15 wherein the operations further comprise:
determining whether a pose in the set of poses is reachable; and
based at least on the pose not being reachable, rejecting the pose.

A18. The computer product code of claim 15 wherein the calibration chart is attached to an end effector of the robot arm, and wherein the optical sensor is mounted on a body of the robot.

A19. The computer product code of A15 wherein the optical sensor is mounted on the robot arm.

A20. The computer product code of A15 wherein the optical sensor is a first optical sensor, and wherein the operations further comprise:
determining a trigger event for calibrating the first optical sensor, wherein determining the trigger event comprises:
comparing images captured with the first optical sensor with images captured with a second optical sensor; and
wherein determining the set of poses for calibrating the first optical sensor comprises:
based at least on the trigger event, determining the set of poses for calibrating the first optical sensor.

When introducing elements of aspects of the disclosure or the implementations thereof, the articles "a," "an," "the," and "said" are intended to mean that there are one or more of the elements. The terms "comprising," "including," and "having" are intended to be inclusive and mean that there could be additional elements other than the listed elements. The term "implementation" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for automatic calibration of a robot optical sensor, the system comprising:
   an optical sensor;
   a robot arm;
   a calibration chart;
   one or more processors; and
   a memory storing instructions, that when executed by the one or more processors, cause the one or more processors to perform operations comprising:
      determining a set of poses for calibrating the optical sensor;
      generating, based at least on the set of poses, pose data comprising three dimensional (3D) position and orientation data;
      moving, based at least on the pose data, the robot arm into a plurality of poses;
      at each pose of the plurality of poses, capturing a set of images of the calibration chart with the optical sensor;
      calculating intrinsic calibration parameters, based at least on known properties of the calibration chart and the set of captured images of the calibration chart at each pose of the plurality of poses;
      applying the calculated intrinsic calibration parameters to the set of captured images of the calibration chart to obtain an updated set of the captured images of the calibration chart; and
      calculating extrinsic calibration parameters, based at least on the updated set of captured images of the calibration chart.

2. The system of claim 1, wherein the operations further comprise:
   wherein extrinsic calibration parameters relate world coordinates with coordinates of the optical sensor.

3. The system of claim 1, wherein the operations further comprise:
   determining whether a pose in the set of poses is reachable; and
   based at least on the pose not being reachable, rejecting the pose.

4. The system of claim 1, wherein the calibration chart is attached to an end effector of the robot arm, and wherein the optical sensor is mounted on a body of the robot.

5. The system of claim 1, wherein the optical sensor is mounted on the robot arm.

6. The system of claim 1, wherein the operations further comprise:
   determining a trigger event for calibrating the optical sensor; and
   wherein determining the set of poses for calibrating the optical sensor comprises:
      based at least on the trigger event, determining the set of poses for calibrating the optical sensor.

7. The system of claim 6 wherein the optical sensor is a first optical sensor, and wherein the system further comprises:
   a second optical sensor; and
   wherein determining the trigger event comprises comparing images captured with the first optical sensor with images captured with the second optical sensor.

8. A method of automatic calibration of a robot optical sensor, the method comprising:
   determining a set of poses for calibrating an optical sensor;
   generating, based at least on the set of poses, pose data comprising three dimensional (3D) position and orientation data;
   moving, based at least on the pose data, a robot arm into a plurality of poses;
   at each pose of the plurality of poses, capturing a set of images of a calibration chart with the optical sensor;
   calculating intrinsic calibration parameters, based at least on known properties of the calibration chart and the set of captured images of the calibration chart at each pose of the plurality of poses;
   applying the calculated intrinsic calibration parameters to the set of captured images of the calibration chart to obtain an updated set of the captured images of the calibration chart; and
   calculating extrinsic calibration parameters, based at least on the updated set of captured images of the calibration chart.

9. The method of claim 8 further comprising:
   wherein extrinsic calibration parameters relate world coordinates with coordinates of the optical sensor.

10. The method of claim 8 further comprising:
    determining whether a pose in the set of poses is reachable; and
    based at least on the pose not being reachable, rejecting the pose.

11. The method of claim 8, wherein the calibration chart is attached to an end effector of the robot arm, and wherein the optical sensor is mounted on a body of the robot.

12. The method of claim 8, wherein the optical sensor is mounted on the robot arm.

13. The method of claim 8 further comprising:
    determining a trigger event for calibrating the optical sensor; and
    wherein determining the set of poses for calibrating the optical sensor comprises:
       based at least on the trigger event, determining the set of poses for calibrating the optical sensor.

14. The method of claim 13, wherein the optical sensor is a first optical sensor, and wherein determining the trigger event comprises: comparing images captured with the first optical sensor with images captured with a second optical sensor.

15. A computer program product, comprising a computer storage media having a computer readable program code embodied therein, the computer readable program code adapted to be executed to implement a method for automatically calibrating a robot optical sensor, the method comprising:
    determining a set of poses for calibrating an optical sensor;
    generating, based at least on the set of poses, pose data comprising three dimensional (3D) position and orientation data;
    moving, based at least on the pose data, a robot arm into a plurality of poses;
    at each pose of the plurality of poses, capturing a set of images of a calibration chart with the optical sensor;
    calculating intrinsic calibration parameters, based at least on known properties of the calibration chart and the set of captured images of the calibration chart at each pose of the plurality of poses;
    applying the calculated intrinsic calibration parameters to the set of captured images of the calibration chart to obtain an updated set of the captured images of the calibration chart; and calculating extrinsic calibration parameters, based at least on the updated set of captured images of the calibration chart.

16. The computer program product of claim 15, wherein the operations further comprise:
prior to calculating the extrinsic calibration parameters, applying the intrinsic calibration parameters to the set of captured images.

17. The computer program product of claim 15, wherein the operations further comprise:
determining whether a pose in the set of poses is reachable; and
based at least on the pose not being reachable, rejecting the pose.

18. The computer program product of claim 15, wherein the calibration chart is attached to an end effector of the robot arm, and wherein the optical sensor is mounted on a body of the robot.

19. The computer program product of claim 15, wherein the optical sensor is mounted on the robot arm.

20. The computer program product of claim 15, wherein the optical sensor is a first optical sensor, and wherein the operations further comprise:
determining a trigger event for calibrating the first optical sensor, wherein determining the trigger event comprises:
comparing images captured with the first optical sensor with images captured with a second optical sensor; and
wherein determining the set of poses for calibrating the first optical sensor comprises: based at least on the trigger event, determining the set of poses for calibrating the first optical sensor.

* * * * *